United States Patent [19] [11] 4,434,697
Roses [45] Mar. 6, 1984

[54] INDICATOR APPARATUS FOR INDICATING NOTES EMITTED BY MEANS OF A MUSICAL INSTRUMENT

[76] Inventor: Henri Roses, 11 rue Mably, 21000-Dijon, France

[21] Appl. No.: 296,413
[22] PCT Filed: Dec. 24, 1980
[86] PCT No.: PCT/FR80/00189
§ 371 Date: Aug. 24, 1981
§ 102(e) Date: Aug. 24, 1981
[87] PCT Pub. No.: WO81/01898
PCT Pub. Date: Jul. 9, 1981
[51] Int. Cl.[3] ........................ G04F 5/02; G09B 15/02; G10G 7/02
[52] U.S. Cl. .................................. 84/454; 84/477 R; 84/484
[58] Field of Search ..................... 84/454, 477 R, 478, 84/484

[56] References Cited

U.S. PATENT DOCUMENTS 4,012,979 3/1977 Wemekamp ...................... 84/478 X
4,122,751 10/1978 Calvin .................................. 84/454
4,163,408 8/1979 Capano et al. ........................ 84/454
4,198,606 4/1980 Baba .................................. 84/454 X
4,205,584 6/1980 Foerst .................................. 84/454
4,227,437 10/1980 Inloes et al. .......................... 84/454
4,253,373 3/1981 Foerst .................................. 84/454
4,273,023 6/1981 Mercer ................................. 84/454

FOREIGN PATENT DOCUMENTS 1547594 6/1967 Fed. Rep. of Germany .
2716910 10/1978 Fed. Rep. of Germany .

*Primary Examiner*—S. J. Witkowski
*Attorney, Agent, or Firm*—Lerner, David, Littenberg & Samuel

[57] ABSTRACT

The sound to be identified is converted into an electrical signal which is applied to an amplifier (11), a filtering circuit (13) and a calculation device (20); the calculation device comprises a microprocessor (21) and associated memories (22,23) comprising a table of the identifiable notes and octaves, so as to work out a representative value of the frequency of the sound to be identified, to control the reading in the table of notes (23*a*) in relation to the said worked out value and so as to control the display of the note read on display means (27) connected to the calculation device (20).

11 Claims, 4 Drawing Figures

Figure 1:
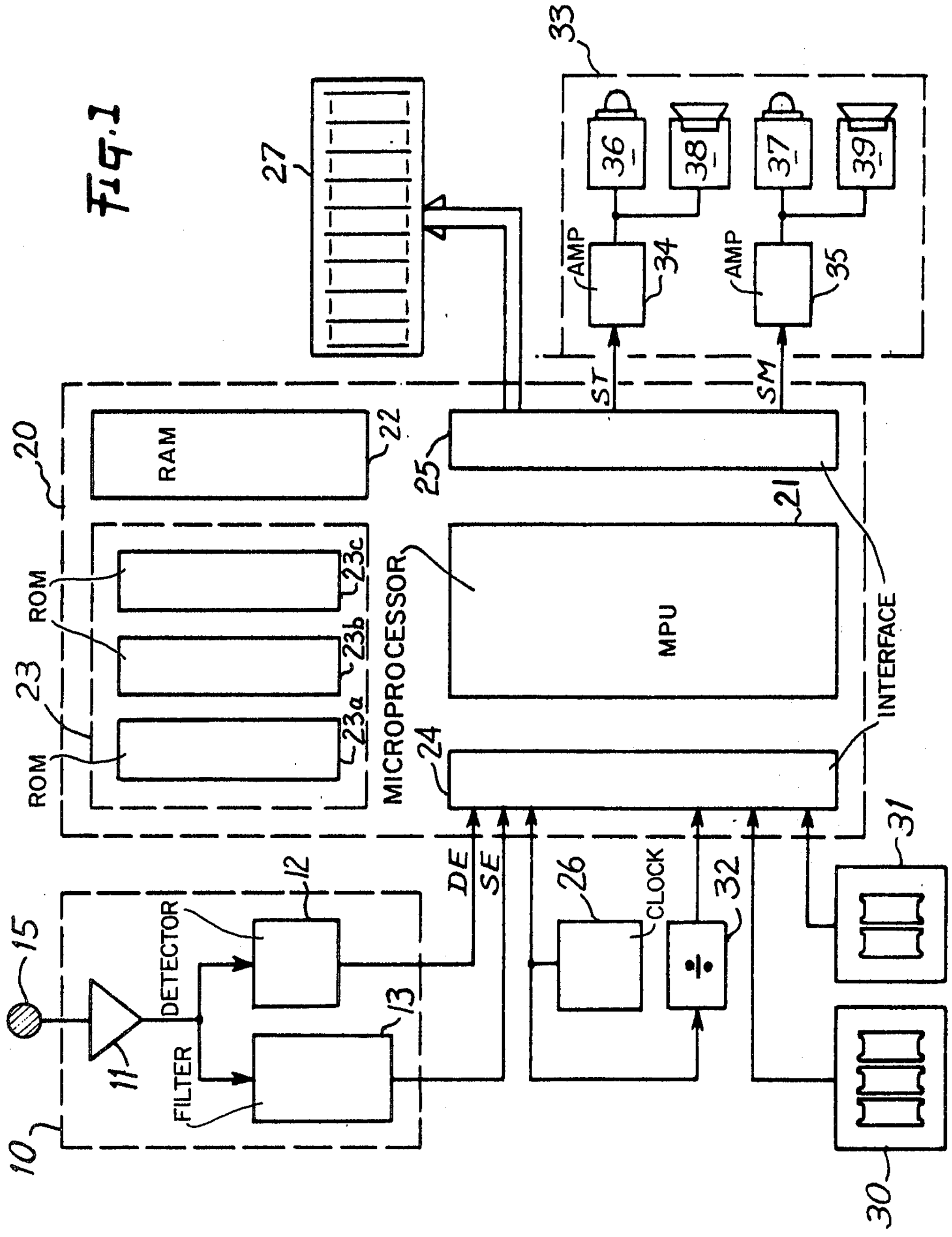

INDICATOR APPARATUS FOR INDICATING NOTES EMITTED BY MEANS OF A MUSICAL INSTRUMENT

The present invention relates to an indicator apparatus for notes emitted by means of an instrument.

By instrument is meant here any wind or string musical instruments, the human voice, or any other devices producing sounds.

It is known that instruments, and in particular string instruments, require frequent tunings due to variations in temperature or hygrometry, or because of the hysteresis of tensile forces. The tuning can only be achieved by comparing the produced sound to a key note (diapason) or, just simply, by listening to that sound. This, however, pre-supposes a considerable experience and a particularly sharp "ear" for music.

Different types of apparatus have already been proposed to tune musical instruments by measuring the frequency of the sounds produced by said instruments.

Such an apparatus is described in German Patent Application DE No. 1 547 594. Said known apparatus comprises a calculating unit to effect the difference between a digital value representative of the frequency of the note to be checked and a digital reference value selected from a memory of a diode matrix type by actuating a keyboard. The difference calculated is displayed as well as its sign. With such an apparatus therefore, a manual intervention is necessary to select a new reference value everytime a note has to be controlled. This makes the apparatus difficult to use.

Another known apparatus is described in German Patent Application DE No. 2 716 910. With this particular apparatus, the frequency of the note to be controlled is measured and displayed in digital form, by counting the number of oscillations for a reference period of about one second. Such a reference period is relatively long. Moreover, the display of the result in digital form makes it necessary to effect a mental note/frequency or frequency/note conversion.

It is an object of the present invention to propose a device permitting instantly and without any manoeuvring, to clearly display any note produced by way of an instrument, or more specifically, to clearly display the exact note closest to the sound produced by the instrument, with an indication as to the situation of the sound produced with respect to the displayed note.

It is also an object of the invention to propose a device which can be used by beginners as well as by experienced musicians to control the tuning of their instrument or even to control the accuracy of the notes that they produce with the said instrument.

Another object of the invention is to propose a device which is relatively inexpensive, easy to use, and to which extra functions can be added, for very little cost, which functions are useful when learning a musical instrument.

These objects are attained with a device comprising:

An amplifier for amplifying a signal representing a sound to be identified, a filtering circuit connected to the output of the amplifier, a calculation device connected to the output of the filtering circuit for working out a representative value of the frequency calculated, in which device, according to the invention, said calculation device comprises a microprocessor, and memories connected to said microprocessor and comprising a table of notes in which are recorded items of information which represent the identifiable notes and octaves, the reading of one such item of information in said table being controlled in relation to the measured value of the frequency of the sound to be identified, and display means are connected to said calculation device to receive the information read in said table and display that item of information which represents the closest note to the sound to be identified and the octave in which said sound is situated.

The use of a microprocessor with a memory constituting a table of notes, in which table are recorded all identifiable notes, makes it possible to obtain a display in uncoded form of the note to be identified, and this instantly and without any special manoeuvring.

Advantageously, the calculating device comprises means to estimate the difference between the calculated frequency of the sound to be identified and the frequency of the closest note read in the table and to work out an information of accuracy depending on that difference, and said display means are arranged so as to receive the said accuracy information and display it.

Said accuracy information is for example displayed in the form of a + or − sign, or of 0, depending on the sign and amplitude of the difference between the calculated frequency and the frequency of the displayed note.

According to a particular feature of the apparatus according to the invention, said apparatus comprises time and measure selection means connected to the calculating device, which latter comprises means for counting the pulses delivered by a time base and to issue a triggering signal at the end of each time and each measure selected, and indicator means are connected to the calculating device to indicate the times and measures in response to the triggering signals.

By taking advantage of the resources offered by the microprocessor and by its associated circuits, the apparatus is then given the added function of metronome.

The indicator means can be light indicators of different colors for the times and the measures, or they can be sound indicators of different tones for the times and for the measures. In this last case, the sounds produced are advantageously notes from the scale, this giving a self-testing possibility by operating simultaneously the sound indicators and the means to display the note produced by the said indicators.

According to another feature of the apparatus according to the invention, the calculating device comprises a table of chords in which are recorded items of information representing predetermined combinations of several notes.

The apparatus thus has an added function in that it memorizes scales, arpeggios and chords which are useful to learn how to read music, and to learn tones, intervals and harmony.

Figure 2:
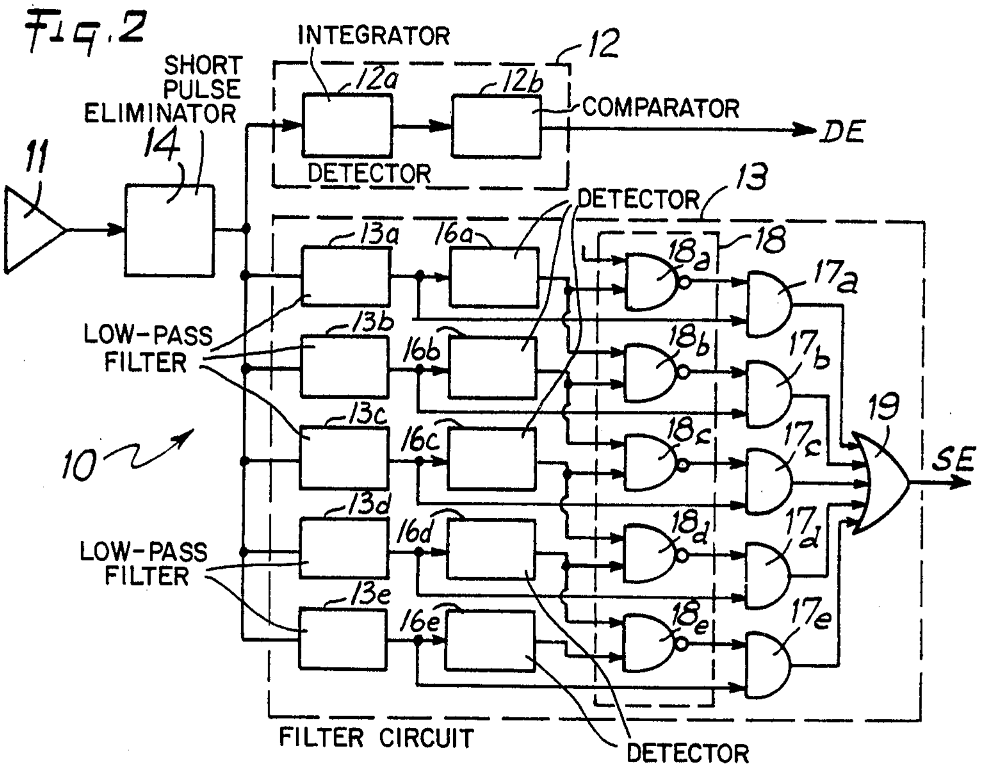
Figure 3:
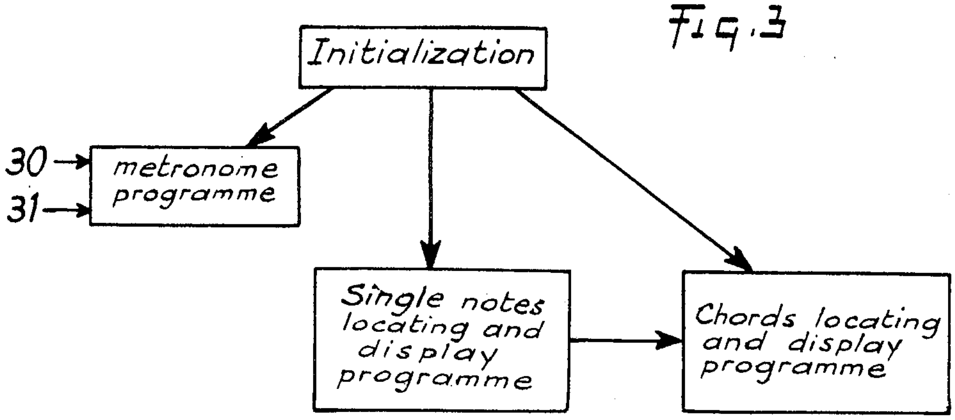
Figure 4:
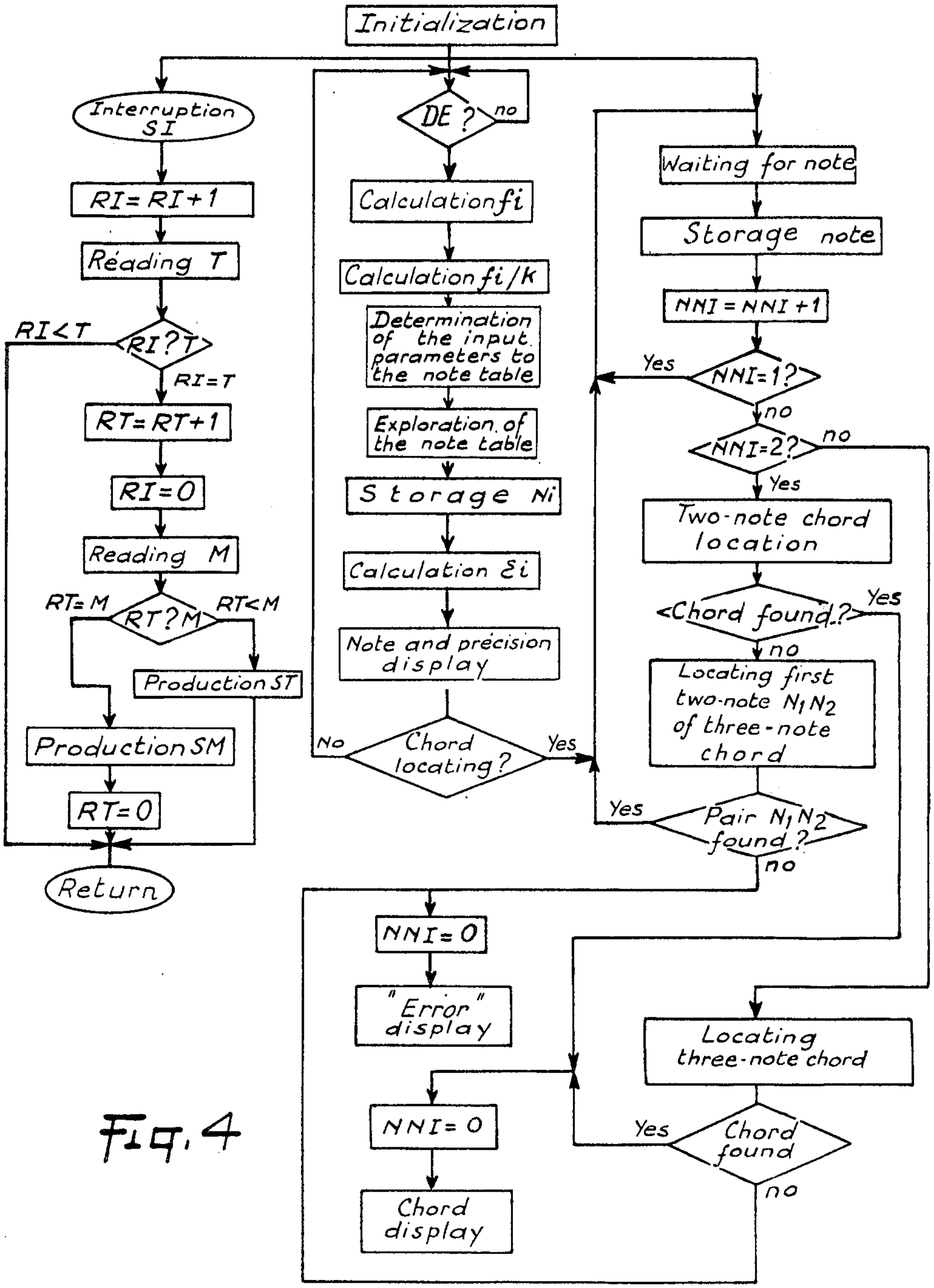

Other particulars and advantages of the apparatus according to the invention will appear from the reading of the description made thereafter by way of indication, but not as a limitation, with reference to the accompanying drawings, in which:

FIG. 1 is a general diagram of one embodiment of the apparatus according to the invention, FIG. 2 is a more detailed diagram of the input circuit of the apparatus of FIG. 1, and FIGS. 3 and 4 are flow-charts relating to different operations performed by means of the microprocessor of the apparatus of FIG. 1.

The sounds to be identified are converted by means of a microphone 15 into electrical signals applied to an input circuit 10 which comprises an amplifier 11, an energy detector 12 and a filtering circuit 13. The output signal of the filtering circuit is applied to a calculation device 20.

The calculation device 20 comprises a microprocessor 21, random access memories or RAM 22, read-only memories or ROM 23, an input interface circuit 24, an output interface circuit 25, and it receives pulses from a time base or clock 26.

For each operating period of the microprocessor (for example 200 milliseconds), the detector output signal frequency is calculated and transferred into a RAM of the calculation device. Then the closest frequency note to that calculated is located in one 23*a* of the ROM 23, which contains in the form of a table of notes all the notes identifiable by the apparatus in the different octaves. The calculation device also works out the quantity $\epsilon = \Delta f/f_n$, $\Delta f$ being the difference between the frequency calculated and the frequency of the located note, and it controls the display of said note as well as of a sign +, − or 0 depending on whether $\epsilon > \epsilon_o > 0$, or $\epsilon < \epsilon'_o < 0$, or $\epsilon'_o \leqq \epsilon \leqq \epsilon_o$. The quantities $\epsilon_o$ and $\epsilon'_o$ are predetermined accuracy threshold values. For example, $\epsilon_o$ is selected to equal 1% and $\epsilon'_o$ to equal −1%.

This display is achieved on a display device 27 connected to the output interface circuit 25 of the calculation device. The device 27 is for example constituted by an alphanumerical display device with liquid crystals.

The apparatus illustrated in FIG. 1 further comprises coding wheels 30 and 31 designed respectively to select times and measures and connected to the calculation device via an input interface circuit 24. A frequency divider 32 receives the clock pulses of the time base 26 and is also connected to the calculation device 20.

The coding wheels 30 and 31 are for example, three and two in number respectively, each one numbered from 0 to 9. By way of indication, the time intervals can be graduated linearly from 40 to 208, the graduation 60 corresponding to 1 second, whereas each measure can contain up to 32 times. The time intervals and the number of times per measure are selected by hand by actuating the coding wheels.

The pulses SI produced by the frequency divider 32 which have for example a period of 1/300th of a second, are counted by means of the calculation device 20 which produces a signal ST, each time the value selected for a time interval is reached, and a signal SM, each time the value selected for a measure is reached.

The signals ST and SM are received by indicator means 33 in order to mark the times and measures selected. Said indicator means comprise amplifiers 34, 35 receiving the signals ST and SM respectively and amplifying them. Said amplified signals are applied, on the one hand, to respective light indicators 36, 37 of different colors and, on the other hand, to respective sound indicators 38, 39 of different tones. Switching means (not shown) are provided to switch on the light indicators, or the sound indicators or both.

In response to each signaal ST and SM, the light indicators produce a flash of light and the second indicators produce a very short sound. The apparatus thus acts as a metronome or rhythm generator.

When the apparatus is used for its "note display" function, the times and measures are indicated only by luminous flashes.

Preferably, the sounds produced by the sound indicators are specific notes from the scale, but different. Thus it is possible to check the good working state of the apparatus by a self-test process using simultaneously the "note display" function and the "metronome" function, without any other emission of sounds.

It will also be noted that owing to the resources of the microprocessor, the times and measures values can be selected automatically, for example by programming rhythms with varied sequences.

It will be further noted that predetermined combinations of notes can be recorded in a chord table 23*b*, comprised in the ROM or RAM of the calculation device, each combination constituting a chord, the knowledge of which is essential to learn harmony.

The apparatus is then advantageously provided with the possibility of conducting a special chord verification programme.

The chord verification programme comprises a step which consists in defining and recording the successive notes of a chord played by a musician and in finding out whether the chord identified this way is recorded in the chord table 23*b*. The display on the device 27 of the identified chord is performed on the device 27 if said chord is amongst the prerecorded ones in the table 23*b*. If not, the display of the word "ERROR", for example, is controlled.

The chord verification programme can also form part of a more general programme of chords sequence, for controlling the performance of successive chords according to a predetermined sequence.

The structure and different functions of the apparatus have been described hereinabove in general. Examples of embodiments of certain parts of the apparatus and of the execution programmes of the different functions will now be described in more details.

FIG. 2 shows an embodiment of the input circuit 10.

The signals delivered by the microphone 15 are amplified by way of an automatic gain control amplifier 11 in order to obtain amplified signals of constant amplitude. This permits to compensate the fading in time of sounds produced by a musical instrument such as for example, a piano.

A short pulse eliminator circuit 14 is connected to the output terminal of the amplifier 11, the circuit 14 comprising for example a capacitor connected between the output terminal of the amplifier and a terminal to a reference potential (earth).

The output of the circuit 14 is connected, on the one hand, to the energy detecting circuit 12, and, on the other hand, to the filtering circuit 13.

The circuit 12 comprises an integrator 12*a* to integrate the amplified signal received. The level of the output signal from the integrator 12*a* is compared to a predetermined threshold value, by means of a circuit 12*b* for example a flip-flop or a comparator, which produces a signal DE when this threshold is exceeded. As can be seen hereinafter, the signal DE authorizes the working of the calculation device 20 to identify the note received by the input circuit 10.

The filtering circuit 13 is designed to eliminate the frequency harmonics of the note received. To this effect, it comprises low-pass filters 13*a*, 13*b*, 13*c*, 13*d*, 13*e* whose cutoff frequencies are the top limit frequencies of the successive octaves, in the audio field—i.e respectively about 78, 156, 311, 622, 1244, 2488 Hz for example. Other filters can be added for the upper octaves.

The outputs of the filters 13*a* to 13*e* are connected, on the one hand, to respective threshold detectors 16*a* to 16*e* and, on the other hand, to signal inputs of respective analog AND gates 17*a* to 17*e*. A logic circuit 18 has inputs connected respectively to the outputs of threshold detectors 16$a$ to 16$e$ and outputs connected respectively to control inputs of the gates 17$a$ to 17$e$.

Each threshold detector 16$a$ to 16$e$ has for example a structure similar to that of the energy detector DE. When the output signal from a filter exceeds the threshold of the corresponding detector, this produces a signal of high level ("1") at the corresponding input terminal of the logic circuit 17. Said latter selects the AND gate which corresponds to the low-pass filter with the lowest cutoff frequency through which passes a signal of adequate level. Thus, any harmonics of the received note which can be found in the higher octaves are eliminated.

To this effect, the logic circuit 18 comprises NON-AND gates 18$a$ to 18$e$ with two inputs. The gate 18$a$ has an input at logic level 0 and its other input is connected to the output of the detector 16$a$. The gate 18$b$ has its inputs connected to the detectors 16$a$ and 16$b$ and so on up to gate 18$e$ whose inputs are connected to the detectors 16$d$ and 16$e$.

The outputs of the AND gates 17$a$ and 17$e$ are joined by an analog OR gate 19. The output signal of the gate 19 constitutes the input signal SE for the calculation device 20.

FIG. 3 shows the general set-up of the software used to operate the calculation device, the different programmes used being recorded in programme memories forming part of the read-only memories 23.

After the normal system setting-up phase, one at least of the following programmes is conducted:

- the "metronome" programme, to indicate predetermined times and measures,
- the "single notes determination and display" programme,
- the "chord locating and display" programme for finding out whether a chord played appears in the chord table.

It will be noted that the "metronome" and "single notes determination and display" programmes can be performed simultaneously. Moreover, the "chord locating and display" programme includes the essential part of the "single notes determination and display" programme.

Reference will now be made to the flow-chart shown in FIG. 4. The "single notes determination and display" programme consists in the following operations:

- testing the presence of DE: this involves checking the presence of the signal DE which indicates that an adequate level of energy is received,
- if DE is received, the frequency $f_i$ of the signal SE converted in numerical form by the interface circuit 24 is measured; to this effect, the number $n_i$ of passages through zero of the signal SE is calculated for a given period, 200 ms for example; each passage through zero is detected by a change of sign of the signal SE and the period of 200 ms is determined by counting the necessary number of pulses from the time base; the value $n_i$ which is measured is stored;
- the input parameters to the note table are calculated in relation to the stored value $n_i$; the note table is set up in octaves and the access to it is done by octave level if the note is clearly enough situated within an octave, or between two middles of octaves if the note is situated at the limit of two octaves; the method for calculating the parameters of input and access to the note table is as follows: First, the octave concerned is determined. Therefor, the measured value of the frequency $f_i$ is divided by a constant predetermined number K. The greatest integer included in the result serves as an address for a first table, where the input address $e_i$ of the note table section to be explored is read. Before exploration of the note table, one checks whether the number corresponding to the frequency $f_i$ divided by K is not too close to the limit between two octaves. If a difference of more than 9% is found between this number and the limits between octaves, the exploration of the notes table is performed starting from the address $e_i$ corresponding to the beginning of the octave concerned (exploration of the first type). If a difference is found less than or equal to 9%, the exploration in the notes table is performed starting from an address $e_i - k$ corresponding to the middle of the octave which is immediately lower (exploration of the second type). The exploration in the note table is finished when the note $N_i$ has been determined with which the difference between the exact frequency of this note and the measured frequency is minimum;
- the note $N_i$ is read and is stored and the precision $\epsilon_i = (f_i - fN_i)/fN_i$ is calculated, $fN_i$ being the exact frequency of the note $N_i$; the quantity $\epsilon_i$ is compared to positive and negative predetermined values $\epsilon_o$ and $\epsilon'_o$ (for example $+1\%$ and $-1\%$) and $\epsilon_i = 1, 0$ or $-1$, depending on whether $\epsilon_i > \epsilon_o > 0$, or $\epsilon'_o \leqq \epsilon_i \leqq \epsilon_o$, or $\epsilon_i < \epsilon'_o < 0$, is stored;
- the note $N_i$ is displayed on the display device 17 together with the sign +, 0 or −, depending on whether $\epsilon_i = 1$, 0 or $-1$;
- then, there is resetting, to wait for another detection of energy unless a chord location is requested; said last condition is checked by controlling the value of a signal RA, which value is for example controlled by actuating a key on the apparatus when the "chord locating and display" programme is requested.

It is presumed that the chords recorded in the chord table are combinations of two or three notes, the chord table being set up in a group of chords of two notes and a group of chords of three notes.

The "chords locating and display" programme comprises the following steps:

- waiting for a note;
- when a first note $N_i$ is identified and when it has been checked that a chord is to be located, said first note is recorded and the content of a register [NNI] (number of notes identified) is placed at 1, said register being initially set to zero;
- then it is checked whether a chord can be located by looking through the content of the register NNI;
- the content of the register NNI being equal to 1, one returns to waiting for another note;
- when a second note $N_2$ is identified, it is recorded and the contents of the register [NNI] is incremented by one unit (NNI=2);
- there is then a possibility of locating a chord in the chord table;
- the search through the chord table is effected by comparing successively each chord of two notes of this table with the pair $N_1$-$N_2$, due to the verification NNI=2;
- if the chord $N_1$-$N_2$ is found in the table 23$b$, the register [NNI] is set back to zero and the chord is displayed on the display device 27;

if the chord $N_1$-$N_2$ is not located, the search is continued amongst the three-note chords listed in the table; if none of these chords comprises $N_1$-$N_2$ as first two notes, the register [NNI] is set back to zero and the word "ERROR" is displayed on the device 27; but on the contrary, if one of the chords of the table starts with the notes $N_1$-$N_2$, one returns to waiting for a third note;

when a third note $N_3$ is located, it is recorded and the contents of the register [NNI] is incremented by one unit (NNI=3);

the search through the chord table is effected in the three-note group of chords only, because of the verification NNI=3;

if the chord $N_1$-$N_2$-$N_3$ is found, the register [NNI] is reset to zero and the chord is displayed on the display device 27 (which capacity is indeed choosen to be sufficient for this purpose).

if the chord $N_1$-$N_2$-$N_3$ is not found, the register [NNI] is reset to zero and the word "ERROR" is displayed on the display device 27.

As already indicated hereinabove, said programme can be completed by checking, not only that each chord played is listed in the chord table, but also, that the chords are played in a predetermined order, according to a recorded sequence.

FIG. 4 also illustrates the different operations of the metronome programme. Said programme is for example used in response to the actuation of a special key which closes a switch interposed between the time base 26 and the frequency divider 32. The signal produced by the frequency divider 32 constitutes an interruption signal which triggers off the performance of the following operations:

incrementing by one unit the contents [RI] of a register RI: [RI]+1→[RI];

reading the value T displayed by the coding wheels 30 and converted into number of periods of the interruption signal SI;

comparing the content [RI] of the register RI with the value T;

if [RI]<T, return to the interrupted programme;

if RI=T, incrementing by one unit of the content [RT] of a time register RT: [RT]+1→[RT]

reset to zero of register RI=[RI]→0;

reading of the value M displayed by the coding wheels 31;

comparing the content [RT] of the register RT with the value M;

if [RT]<M, production of an output triggering signal ST and return to the interrupted programme;

if [RT]=M, production of an output triggering signal SM, reset to zero of the register RT [RT]→0, and return to the interrupted programme.

Various modifications and additions may of course be made to the embodiment of the invention described hereinabove.

For example, the frequency f can be calculated by counting the number of pulses of the time base for a predetermined number of periods of the signal SE, each period being for example the interval between two successive passages through zero in the same direction.

In addition, in the case of relatively long sounds being measured, a smoothing of the frequency measurement can be introduced into the programme as well as a smoothing of the identification of the note.

The operation of frequency smoothing is inserted into the single notes display and research flowchart, before calculating the input parameters in the note table (calculation of $f_i/K$). It is known that musicians divide an octave into 12 half-tone intervals, each interval having 1.05946 times the frequenncy of the preceding lower halftone, i.e. a frequency about 6% higher. Then the following smoothing process is used; $f_i$ being the frequency which has just been measured, the frequency is "smoothed" by giving it the value $f_{in}=\frac{1}{2}(f_i+f_{in-1})$ if $$\left|\frac{f_i - f_{in-1}}{f_i}\right| \leq \frac{3}{100} \text{ or } f_{in} = f_i \text{ if } \left|\frac{f_i - f_i - f_{in-1}}{f_i}\right| > \frac{3}{100},$$

designating the previously determined smooth frequency by $f_{in-1}$. In other terms, a new value $f_i$ is taken into account if it differs from the preceding value by more than 3%; if not the arithmetical average is worked out between said new value and the previous value.

The note smoothing operation is inserted before the display of the note and of its accuracy. This operation consists in conducting a majority test on the accuracy provided that the note remains the same three times in succession. The majority test consists in displaying—if the accuracy—is determined at least twice out of three times, in displaying +, if the accuracy + is determined at least twice out of three times, and in displaying 0 if the accuracy 0 is determined three times, or if once each accuracy +, − and 0 is determined once. In the case where to measure a sound, the same note is not obtained three times in succession, it can be fitting to display the word "ERROR".

I claim:

1. Apparatus for indicating the presence of musical notes and for identifying the musical notes detected comprising:

means for amplifying input signals corresponding to musical notes to be identified;

filter means connected to said means for amplifying for eliminating harmonics from said input signals;

energy detecting means connected to said means for amplifying for detecting input signals exceeding a predetermined threshhold;

memory means including at least one memory for storing items of information representing a table of musical notes;

means for calculating the frequency and octive of said input signal, said means for calculating including microprocessor means and being connected to said filter means, said energy detecting means and said memory means, said means for calculating being responsive to input signals received from said filter means exceeding said predetermined threshhold determined by said energy detecting means to calculate the frequency thereof, said frequency calculated being employed to read from said memory for storing items of information representing a table of musical notes items of information representing the closest corresponding musical note for said frequency calculated; and means for displaying, in alphanumeric form, said musical note read closest to each successive musical note in said input signals to be indentified and the octive in which said musical note resides.

2. The apparatus according to claim 1 wherein said means for calculating additionally comprises:

means for determining any difference between said frequency of said input signals calculated, and said closest corresponding musical note read;

means for providing indicia representative of any difference determined; and means for supplying said indicia to said means for displaying to cause said indicia to be displayed.

3. The apparatus according to claim 2 wherein said indicia take the form of a plurality of signs, and selected ones of said plurality of signs respectively indicate that a difference between a calculated frequency of an input signal and a frequency of a displayed musical note is a positive value exceeding a predetermined limit, a negative value exceeding a selected limit and a value within a limit.

4. The apparatus according to any one of claims 1, 2 or 3 wherein said filter means comprises:

a plurality of low pass filter means for receiving said input signals representing said musical notes to be identified;

a plurality of threshhold detector means for indicating that input signals applied thereto exceed a predetermined threshhold, each of said plurality of threshhold detector means being connected to an associated one of said plurality of low pass filter means;

means for determining a one of said plurality of low pass filter means having the lowest cut-off frequency characteristic and at least a portion of said input signals having a predetermined threshhold level passing therethrough; and means for inhibiting outputs from remaining ones of said plurality of low pass filter means having cut-off frequency characteristics higher than that of said one of said plurality of low pass filter means.

5. The apparatus according to any one of claims 1, 2 or 3 wherein said energy detecting means includes an integrator means connected to an output of said means for amplifying.

6. The apparatus according to claim 3 additionally comprising means for selecting times and measures, said means for calculating being responsive to said means for selecting times and measures to count pulses provided during a time base and to produce a triggering signal at an end of each time and each measure selected and means connected to said means for calculating for indicating times and measures in response to said triggering signal whereby metronome and rhythm generator functions may be performed.

7. The apparatus according to claim 6 wherein said means for indicating times and measures include light indicators having a plurality of colors for said times and measures.

8. The apparatus according to claim 6 wherein said means for indicating times and measures include sound indicators having a plurality of tones for said times and measures.

9. The apparatus according to claim 8 wherein said plurality of tones correspond to notes of a scale.

10. The apparatus according to claim 1 wherein said memory means includes a memory containing a cord table in which items of information representing predetermined combinations of several notes are recorded.

11. The apparatus according to claim 10 wherein said means for calculating additionally comprises:

means for recording a plurality of notes identified successively;

means for comparing said plurality of notes recorded with said predetermined combinations of several notes present in said cord table; and means for indicating results of comparisons performed by said means for comparing.

* * * * *